(12) United States Patent
Branger et al.

(10) Patent No.: US 10,683,378 B2
(45) Date of Patent: Jun. 16, 2020

(54) IMPRINTED POLYMER AND METHOD FOR PREPARING THE SAME

(71) Applicant: Universite De Toulon, Le Garde (FR)

(72) Inventors: Catherine Branger, Sollies-Pont (FR); Hugues Brisset, Saint-Cyr sur Mer (FR); Dutduan Udomsap, Nice (FR)

(73) Assignee: UNIVERSITE DE TOULON, La Garde (FR)

( * ) Notice: Subject to any disclaimer, the term of this patent is extended or adjusted under 35 U.S.C. 154(b) by 0 days.

(21) Appl. No.: 14/653,712

(22) PCT Filed: Dec. 20, 2013

(86) PCT No.: PCT/IB2013/061196
§ 371 (c)(1),
(2) Date: Jun. 18, 2015

(87) PCT Pub. No.: WO2014/197248
PCT Pub. Date: Jun. 26, 2014

(65) Prior Publication Data
US 2015/0344607 A1    Dec. 3, 2015

(30) Foreign Application Priority Data
Dec. 21, 2012    (FR) .................... 12 62617

(51) Int. Cl.
*C08F 230/04* (2006.01)
*C08F 232/08* (2006.01)
(Continued)

(52) U.S. Cl.
CPC ........ *C08F 222/10* (2013.01); *B01D 15/3852* (2013.01); *B01J 20/268* (2013.01);
(Continued)

(58) Field of Classification Search
CPC . B01D 15/3852; B01J 20/268; B01J 20/3057; C08F 230/04; C08F 232/08; C08F 234/02
See application file for complete search history.

(56) References Cited

U.S. PATENT DOCUMENTS 5,630,978 A * 5/1997 Domb .................... B01J 20/268
264/330
2003/0003587 A1 * 1/2003 Murray .............. G01N 21/7703
436/82

(Continued)

FOREIGN PATENT DOCUMENTS

| EP | 1642984 A1 | 5/2006 | |
| WO | WO 03101580 A1 * | 12/2003 | ............. B01D 15/00 |
| WO | WO-2004067578 A1 * | 8/2004 | ............. B01J 20/26 |

OTHER PUBLICATIONS

Bennett, J. W. et al, "Mycotoxins" Jul. 2013, Clinical Microbiology Reviewss vol. 16 No. 3, p. 497-516 (Year: 2013).*

(Continued)

*Primary Examiner* — Ling Siu Choi
*Assistant Examiner* — David L Miller
(74) *Attorney, Agent, or Firm* — Merchant & Gould P.C.

(57) ABSTRACT

An imprinted polymer that is not electrically conductive is obtained by polymerization of at least one monomer with at least one crosslinking agent in the presence of a target. The polymer has in its structure at least one cavity having the shape of a target and at least one redox probe assuming either a polymerizable form or a non-polymerizable form. Methods are for preparing an imprinted polymer, for detecting a target implementing such a polymer. The polymer is used as a sensor, and more particularly an imprinted sensor, an active interface to manufacture electrochemical (bio) sensors, or to manufacture solid-phase extraction substrates.

18 Claims, 10 Drawing Sheets

(51) Int. Cl.
*C08F 234/02* (2006.01)
*C08F 222/10* (2006.01)
*C08F 2/44* (2006.01)
*B01D 15/38* (2006.01)
*B01J 20/26* (2006.01)
*B01J 20/30* (2006.01)

(52) U.S. Cl.
CPC ............ *B01J 20/3057* (2013.01); *C08F 2/44* (2013.01); *C08F 230/04* (2013.01); *C08F 232/08* (2013.01); *C08F 234/02* (2013.01)

(56) References Cited

U.S. PATENT DOCUMENTS

| | | | | |
|---|---|---|---|---|
| 2003/0129092 | A1* | 7/2003 | Murray | B01J 20/268 422/82.07 |
| 2007/0191551 | A1* | 8/2007 | Kim | B01J 20/26 525/370 |
| 2008/0264868 | A1* | 10/2008 | Murray | B01D 15/00 210/684 |
| 2009/0099301 | A1* | 4/2009 | Naraghi | B01J 20/26 524/600 |
| 2011/0159160 | A1* | 6/2011 | Jonsson | A24B 15/24 426/442 |

OTHER PUBLICATIONS

International Search Report for International Application No. PCT/IB2013/061196, dated Apr. 7, 2014.

Krupadam R. J. et al.: "Fluorescence spectrophotometer analysis of polycyclic aromatic hydrocarbons in environmental samples based on solid phase extraction using molecularly imprinted polymer", Environmental Science and Technology, American Chemical Society, Easton, PA, US, vol. 43, No. 8, Apr. 15, 2009 (Apr. 15, 2009), pp. 2871-2877, XP008161640.

* cited by examiner

MIP5　　　　　　　　　　　　　　　　NIP5

MIP6　　　　　　　　　　　　　　　　NIP6

IMPRINTED POLYMER AND METHOD FOR PREPARING THE SAME

This application is a National Stage Application of International Application No. PCT/IB2013/061196, filed Dec. 20, 2013, which claims benefit of Serial No. 12 62617, filed Dec. 21, 2012 in France and which application(s) are incorporated herein by reference. To the extent appropriate, a claim of priority is made to each of the above disclosed applications.

FIELD OF THE INVENTION

The present invention relates to a nonelectrically conducting imprinted polymer obtained by polymerization of at least one monomer with at least one crosslinking agent, said polymer exhibiting, in its structure, at least one cavity having the shape of a target. The invention also relates to a process for the preparation of an imprinted polymer, to a process for the detection of a target employing such a polymer, and to the uses of such a polymer as active interface for the manufacture of electrochemical sensors or for the manufacture of solid-phase extraction supports.

BACKGROUND OF THE INVENTION

Micropollutants are defined as being organic or ionic chemical substances of natural or anthropic origin capable of having a toxic action at minute concentrations in a given medium. In water, these contaminants are highly varied: pesticides, steroids, polycyclic aromatic hydrocarbons (PAHs), active principles, surfactants, cosmetics, metal ions, microtoxins, bacterial toxins and the like. These pollutants are the subject of close monitoring, in particular in water intended for human consumption (Directive 98/83/CE of the Council of 3 Nov. 1998, Official Journal of the European Communities).

However, the analysis of traces of micropollutants is proving to be problematic and requires beforehand the installation of a pretreatment, followed by the use of detection techniques such as liquid chromatography coupled to detection by fluorescence, by UV-visible spectroscopy or by mass spectrometry, or gas chromatography coupled to mass spectrometry (P. Plaza-Bolaños et al., Analytical methods and trends, J. Chrom. A., 1217 (2010), 6303-6326). However, these techniques, although very efficient, can only be employed in the laboratory. In addition, they exhibit the disadvantage of requiring sometimes very long periods of time, which limits the possibilities of rapid interventions during a pollution event. The monitoring in real time, thus in situ, of these toxic agents requires the development of sensors combining miniaturization, speed, low costs and ease of use.

There exists three main categories of sensors having different transduction modes: optical, piezoelectric or electrochemical:
- the optical solution, which is generally very sensitive, lends itself with difficulty to miniaturization due to a significant noise/signal ratio (X.-A. Ton et al., Biosens. Bioelec., 36 (2012), 22-28; P. Turkewitsch et al., Anal. Chem., 1998, 70, 2025-2030),
- the piezoelectric route remains problematic to employ in the case of analyses in a liquid medium (C.-Y. Lin et al., Chem. Eur. J., 2003, 9, 5107-5110),
- for their part, electrochemical sensors exhibit the advantage of being able to be miniaturized without loss of sensitivity due to a low noise/signal ratio. In addition, they exhibit a low production cost. However, in the case of complex matrices, it is necessary, in order to be able to analyze them, to introduce, into the electrochemical sensor, specific sites for recognizing the analyte in order to improve the detection and/or the quantification thereof; it is in this context that molecularly imprinted electrochemical sensors (V. Suryanarayanan et al., Electroanal., 22 (2010), 1795-1811) and ion imprinted electrochemical sensors (T. Prasada Rao et al., Anal. Chim. Acta, 578 (2006), 105-116) have been developed.

The principle of printed sensors is based on the use of molecularly imprinted polymers (MIP) or of ion imprinted polymers (IIP).

The imprinted polymers are three-dimensional polymer networks prepared in the presence of a target molecule or a target ion, around which the polymer network is constructed via specific interactions between the target and a functional monomer, in the presence of a crosslinking agent. The release of the imprinted molecule or of the imprinted ion generates cavities incorporating functionalities complementary to the molecule or the ion (FIG. 1). These materials thus exhibit a high molecular or ion recognition power, their activity limiting that of biological receptors of antibody type (K. Haupt et al., Chem. Rev., 100 (2000), 2495-2504), MIPs or IIPs being more stable and easier and cheaper to manufacture than antibodies and being able to be stored for very long periods of time before use (V. Pichon, J. Chrom. A., 1152 (2007), 41-53).

Two synthetic routes can be envisaged for the preparation of molecularly or ion imprinted electrochemical sensors:
- A first route in which the imprint is generated within an electrically conducting polymer devoid of crosslinking agent, the polymer having the twofold role of recognition and of transducer, the phenomenon of recognition being converted into a measurable electrical signal. This route exhibits numerous advantages and in particular ease of use, control of the thickness of the electrogenerated film and the possibility of precisely depositing the detection system on a given surface (T. L. Panasyuk et al., Anal. Chem., 71 (1999), 4609-4613). Nevertheless, their use involves the application of electrochemical measurements which can result, for example, in the entry and in the exit of counterions in the conducting polymer. These measurements detrimentally affect the imprint, in particular as a result of the noncrosslinking of the polymer network, and, eventually, the ability of the sensor to specifically track the target.
- A second route in which the MIP and the transducer are separate elements. This route consists of the incorporation of particles of MIPs or IIPs, prepared and crosslinked beforehand, within a conductive phase which can be an electrically conducting polymer (K. Ho et al., Anal. Chim. Acta, 542 (2005), 90-96), or also an electrode based on carbon paste (N. Kirsch et al., Analyst., 126 (2001), 1936-1941). In this case, the risk of denaturing the imprint decreases, the disadvantage being a more difficult transmission of the information between the MIP or the IIP which has tracked the target and the conductive phase of the electrode.

Thus, the technical problem remaining to be solved with respect to this state of the art consists of the development of a crosslinked imprinted polymer which makes possible effective transmission of the recognition phenomenon as a measurable electrical or electrochemical signal.

The technical problem of the invention lies more particularly in the development of an imprinted polymer fulfilling the role of imprinted sensor, by making it possible to directly detect a target by direct transmission of the recognition phenomenon as a measurable electrical or electrochemical signal, without it being necessary to use additional transmission means (electrochemistry, fluorescence, and the like).

SUMMARY OF THE INVENTION

The solution provided by the inventors is a novel imprinted polymer incorporating, in its structure, a redox probe as means for transmission of the signal, the inventors having observed that the presence of a redox probe close to the recognition site significantly improves its detection sensitivity. The imprinted polymer developed by the inventors also exhibits high stability and a long shelf life before use. In addition, it can be easily manufactured via an economically advantageous process.

The imprinted polymer of the invention also exhibits the advantage of being able to be used with any type of target, without this target necessarily exhibiting redox properties, the detection of the target taking place via the redox probe.

The invention thus relates to a nonelectrically conducting imprinted polymer obtained by polymerization of at least one monomer with at least one crosslinking agent in the presence of a target, said polymer exhibiting, in its structure, at least one cavity having the shape of said target and comprising, in its structure, at least one redox probe provided either in the polymerizable form or in the nonpolymerizable form.

Within the meaning of the invention, redox probe is understood to mean any compound capable of being oxidized and/or reduced.

Preferably, the redox probe is located in the vicinity of the cavity having the shape of a target. "Vicinity" is understood to mean the minimum distance for the redox probe to be capable of interacting with the target and of providing an electrochemical response in the form of a detection signal. Obtaining an electrochemical response makes it possible to regard the redox probe as being in the vicinity or in the neighborhood of the cavity having the shape of a target. In other words, the redox probe is located in the imprinted polymer of the invention so that it can interact with the target and provide an electrochemical response in the form of a detection signal. Advantageously, the redox probe is located in the cavity having the shape of a target and forms part of this cavity.

According to an advantageous embodiment, the imprinted polymer of the invention does not comprise another means of transmission (electrochemistry, fluorescence, and the like), other than the redox probe present in the structure of the polymer.

Within the meaning of the invention, target is understood to mean any entity which can be used to form the cavity (or imprint) and which can interact subsequently in a specific way with this cavity, it being possible for this target to be either a molecule or an ion. The cavity thus acts as recognition site for the target. The cavity is thus complementary in shape and/or in functionality to the target. The imprinted polymer of the invention can thus be either a molecularly imprinted polymer (MIP), or an ion imprinted polymer (IIP).

When the target is a molecule, the latter can be chosen from polycyclic aromatic hydrocarbons (PAHs); steroids; active principles; pesticides; herbicides; surfactants; food dyes, such as carotenoids, riboflavins, tartrazine or amaranth; dyes, such as azo dyes, polymethine dyes or phthalocyanine; or biologically active molecules, such as polypeptides, proteins, enzymes, hormones or cytokines.

When the target is a PAH, said PAH can be acenaphthene, acenaphthylene, anthracene, benz[a]anthracene, benzo[a]pyrene, benzo[e]pyrene, benzo[b]fluoranthene, benzo[e]pyrene, benzo[g,h,i]perylene, benzo[j]fluoranthene, benzo[f]fluoranthene, benzo[k]fluoranthene, chrysene, coronene, corannulene, cyclopenta[c,d]pyrene, dibenzo[a,e]pyrene, dibenz[a,c]anthracene, dibenz[a,h]anthracene, dibenzo[a,h]pyrene, dibenzo[a,i]pyrene, dibenzo[a,l]pyrene, fluoranthene, fluorene, indeno[1,2,3-cd]pyrene, ovalene, pentacene, perylene, phenanthrene, pyrene, tetracene, triphenylene or zethrene.

When the target is a pesticide, said pesticide can be an acaricide, a bactericide, a corvicide or crow repellant, a fungicide, an insecticide, a molluscicide, a nematocide, a parasiticide, a rodenticide or a mole killer.

When the target is a herbicide, said herbicide can be an inorganic herbicide chosen from calcium cyanide ($Ca(CN)_2$), iron sulfate ($FeSO_4$) or sodium chlorate ($NaClO_3$), or an organic herbicide chosen from glyphosate, dinitroanilines (toluidines, benfluralin, butralin, fluchloralin, nitralin, oryzalin, pendimethalin, trifluralin), substituted ureas (chlortoluron, chloroxuron, cycluron, diuron, ethidimuron, fenuron, isoproturon, linuron, monolinuron, methabenzthiazuron, metobromuron, metoxuron, monuron, thiazafluron, tebuthiuron, thiazafluron, siduron, neburon), triazines (atrazine, cyanazine, methoprotryne, propazine, terbuthylazine, simazine, simetryn, secbumeton, terbumeton, ametryn, desmetryn, prometryn, terbutryn), imidazolinones (imazamethabenz, imazapyr), sulfonylureas (amidosulfuron, azimsulfuron, chlorsulfuron, and the like), diphenyl ethers (acifluorfen-sodium, aclonifen, bifenox, bromofenoxim, chlomethoxyfen, diclofop-methyl, fluorodifen, fomesafen, lactofen, nitrofen, oxyfluorfen), synthetic plant hormones (2,4-D, 2,4-MCPA, triclopyr, dichlorprop, MCPP (mecoprop), 2,3,6-TBA, dicamba, picloram, clopyralid, flurenol), nitro dyes (DNBP (dinoseb), DNOC (Dinitro-Ortho-Cresol), dinoterb), PCP (pentachlorophenol), carbamates (asulam, barban, chlorbufam, chlorpropham, propham, carbetamide), thiocarbamates (butylate, cycloate, di-allate, tri-allate, S-ethyl N,N-dipropylthiocarbamate, molinate, prosulfocarb, vernolate, pebulate, thiobencarb), dithiocarbamates (sodium methylaminomethanedithioate, nabam), biscarbamates (desmedipham, phenmedipham, karbutilate), quaternary ammoniums (diquat, paraquat, difenzoquat), fop/dim and pinoxaden (alloxydim-sodium, clodinafop-propargyl).

When the redox probe is provided in the nonpolymerizable form, it can be incorporated in the starting mixture without participating in the polymerization. Reference is then made to "trapping", the redox probe not in this case being covalently bonded to the polymer network.

When the redox probe is provided in the polymerizable form, it has at least one polymerizable site and the monomer of the invention can be the redox probe. The redox monomer is then introduced in the form of a monomer participating in the actual construction of the three-dimensional network (FIG. 2).

When the redox system exhibits two or more polymerizable sites, the crosslinking agent can be the redox probe. The redox probe is then introduced in the form of a crosslinking agent which participates in the actual construction of the three-dimensional network (FIG. 2).

The redox probe can thus be a chemical entity having:
  zero polymerizable site: the redox probe then exists in the nonpolymerizable form, one polymerizable site: the redox probe then exists in the polymerizable form and acts as monomer, or at least two polymerizable sites: the redox probe then exists in the polymerizable form and acts as crosslinking agent.

The redox probe can be chosen, for example, from metallocenes, such as ferrocene, ruthenocene or cobaltocene, tetrathiafulvalene and its derivatives, or anthraquinone and its derivatives. Advantageously, the redox probe can be chosen, for example, from metallocenes, such as ferrocene and cobaltocene, or tetrathiafulvalene and its derivatives.

According to an advantageous embodiment, the redox probe is preferably a redox monomer which participates in the actual construction of the three-dimensional network. Said redox monomer is preferably a monomer carrying at least one functional group of ferrocene type having a polymerizable site, said polymerizable site preferably being chosen from vinyl, (meth)acrylic or allyl sites. The redox probe of the invention is advantageously vinylferrocene (VFc).

The crosslinking agent is advantageously a (meth)acrylic, vinyl, styrene or allyl monomer, preferably chosen from di-, tri- or tetrafunctional groups. According to a preferred embodiment of the invention, the crosslinking agent is an alkyl di-, tri- or tetra(meth)acrylate, an allyl di-, tri- or tetra(meth)acrylate, an aryl di-, tri- or tetra(meth)acrylate, an alkylene glycol di-, tri- or tetra(meth)acrylate, and more preferably ethylene glycol di(meth)acrylate (ED(M)A), tetramethylene di(meth)acrylate, bisphenol A di(meth)acrylate, trimethylolpropane tri(meth)acrylate, pentaerythritol triacrylate (PETRA) and tetraacrylate, tetraethylene glycol di(meth)acrylate, triethylene glycol di(meth)acrylate, hexanediol di(meth)acrylate, 3-(acryloyloxy)-2-hydroxypropyl methacrylate, diallyl diglycol dicarbonate, diallyl maleate, diallyl fumarate, diallyl itaconate, diallyl succinate, diallyl phthalate, triallyl isocyanurate, triallyl melamine, divinylbenzene, divinyl oxalate, divinyl malonate, divinyl ether, divinyl sulfone, N,N'-methylene bisacrylamide (MBA) and their mixture.

Within the meaning of the present invention:

alkyl is understood to mean a saturated, linear or branched, aliphatic hydrocarbon group having at least one carbon atom and preferably from 1 to 30 carbon atoms. Advantageously, the term "alkyl" denotes a saturated, linear or branched, aliphatic hydrocarbon group having from 1 to 12 carbon atoms, and preferably from 1 to 6 carbon atoms. The term "branched" means that at least one lower alkyl group, such as a methyl or an ethyl, is carried by a linear alkyl chain. Mention may be made, as alkyl group, for example, of the methyl, ethyl, n-propyl, isopropyl, n-butyl, t-butyl and n-pentyl groups;

aryl is understood to mean a functional or substituent group derived from at least one aromatic ring; an aromatic ring corresponds to any flat mono- or polycyclic group comprising a delocalized π system in which each atom of the ring comprises a p orbital, said p orbitals overlapping one another.

When the target is an ion, the latter is preferably an ion of one of the following elements: Ni, Pb, Cu, Cd, Co, Zn, Fe, Ag, Hg, As, Pd, Mn, Rh, Al, Sm, Zr, Th, Nd, Eu, Dy, Cr, I, Yt, Tl or Pt.

When the target is an ion, the imprinted polymer of the invention can also comprise, in its structure, at least one ligand provided either in the polymerizable form or in the nonpolymerizable form.

When the ligand is provided in the nonpolymerizable form, it can be chosen from the following compounds: 4-vinylpyridine, 2-vinylpyridine, 1-vinylimidazole, acrylamide, (meth)acrylic acid, 2-hydroxyethyl methacrylate, N-isopropylacrylamide, 2-(diethylamino)methyl methacrylate, styrene, 1,4-dihydroxyanthraquinone, dithizone, dimethylglyoxime, 5-dodecylsalicylaldoxime, 8-hydroxyquinoline, 8-aminoquinoline, 8-mercaptoquinoline, acetylacetone, acetaldehyde thiosemicarbazone, benzaldehyde thiosemicarbazone, vanillin benzidine, 1,5-diphenylcarbazone, ammonium pyrrolidinedithiocarbamate, N,N'-diethylthiourea, 5,7-dichloroquinolin-8-ol, 4-(2-pyridylazo)resorcinol, 4-(2-thiazolylazo)resorcinol, 1-(2-pyridylazo)-2-naphthol, 1-(2-thiazolylazo)-2-naphthol, salen, 8-hydroxyquinoline-5-sulfonic acid, pyrrolidine-1-dithiocarboxylic acid, 1-(2-thiazolylazo)-2-naphthol, sodium salt of 3,4-dihydroxy-9,10-dioxo-2-anthracenesulfonic acid (Alizarin Red S), 2-ethylhexyl benzimidazolyl sulfide, octyl benzothiazolyl sulfide, diazoaminobenzene, quinaldic acid, 6-[(hydroxyamino)methylidene]cyclohexa-2,4-dien-1-one(salicylaldoxime), 5-(4-carboxyphenylazo)-8-hydroxyquinoline, formamidoxime or neocuproine.

When the ligand is provided in the polymerizable form, it can be chosen from the following compounds: N-(4-vinylbenzyl)iminodiacetic acid, 1-hydroxy-4-(prop-2'-enyloxy)-9,10-anthraquinone, 1-hydroxy-2-(prop-2'-enyl)-9,10-anthraquinone, 5-vinyl-8-hydroxyquinoline, N-(6,7,9,10,12, 13,15,16-octahydro-5,8,11,14,17-pentaoxabenzocyclopentadecen-2-yl)acrylamide (benzo-15-crown-5-acrylamide), 4-[(E)-2-(4'-methyl-2,2'-bipyridin-4-yl)vinyl]phenyl methacrylate, 4-vinylphenylazo-2-naphthol, N-methacryloyl-L-histidine, N-methacryloyl-L-cysteine, N-methacryloyl-L-cysteine methyl ester, N-methacryloyl-(L)-glutamic acid, N-methacryloyl-2-mercaptoethylamine, 6-(4-vinylphenylcarbamoyl)pyridine-2-carboxylic acid, pyridine-2,6-dicarboxylic acid bis(4-vinylphenyl)amide, salen or (4-ethenylphenyl)-4-formate-6-phenyl-2,2'-bipyridine.

According to a preferred embodiment, the imprinted polymer of the invention is provided in the form of crosslinked microparticles, with a size which can vary from 0.6 to 6 μm.

Another subject matter of the invention is a process for the preparation of an imprinted polymer comprising the following stages:

(i) the polymerization of a monomer with a crosslinking agent in the presence of a target and of a redox probe provided either in the polymerizable form or in the nonpolymerizable form, it being possible for said monomer to be the redox probe when the latter exists in the polymerizable form and it being possible for said crosslinking agent to be the redox probe when the latter exhibits two or more polymerizable sites, and (ii) the removal of the target present within the polymer obtained at the end of stage (i).

According to an advantageous embodiment, the polymerization stage is carried out by radical polymerization, by polycondensation or by the sol-gel route. The polymerization stage can also be carried out by ionic polymerization. The following polymerization techniques can be employed: bulk, suspension, dispersion, emulsion and precipitation polymerization. Preferably, distillation-precipitation polymerization, during which distillation of the solvent is concomitant with the polymerization reaction, can be used.

In the case of a distillation-precipitation polymerization, stage (i) is carried out in a solvent preferably chosen from acetonitrile, toluene, acetone, ethanol, methanol, n-hexane, tetrahydrofuran, ethyl acetate, ethyl methyl, cyclohexane, 2-methoxyethanol, dimethylsulfoxide, N,N'-dimethylformamide, chloroform, 1,2-dichloroethane, dichloromethane, cyclohexanol, benzyl alcohol or ethyl acetate.

The solvent makes it possible to control the size of the polymer particles and their porosity. According to a preferred embodiment, the solvent of the invention is a polar solvent or a polar solvent/nonpolar solvent mixture, the ratio of which can vary from 95/5 to 70/30. Preferably, the solvent of the invention is acetonitrile or an acetonitrile/toluene mixture, optionally in a proportion ranging from 95/5 to 80/20, and preferably at a ratio 80/20.

Advantageously, stage (i) is carried out by distillation-precipitation polymerization by heating the reaction medium to a first temperature of between 60° C. and 100° C. and by then bringing it to reflux, preferably at a temperature of between 100° C. and 150° C., in order to carry out the distillation.

The polymerization stage can be carried out in the presence of a thermal or UV radical initiator. Examples of thermal or UV initiators include azobisisobutyronitrile, benzoyl peroxide, acetyl peroxide, lauroyl peroxide, azobisisobutyronitrile, t-butyl peracetate, cumyl peroxide, t-butyl peroxide, t-butyl hydroperoxide, 2,2-dimethoxy-2-phenylacetophenone, phenothiazine, 1,1'-azobis(cyclohexanecarbonitrile), 2,2'-azobis(2-methylpropionamidine)dihydrochloride, 2,2'-(2-methyl propionitrile), potassium persulfate or the $H_2O_2$/TEMED (N,N,N',N'-tetramethylenediamine) mixture and preferably azobisisobutyronitrile.

According to an advantageous embodiment, stage (ii) of removing the target is carried out by washing the polymer obtained at the end of stage (i) with a washing solution chosen from dichloromethane, acetone, isopropanol, methanol, N,N-dimethylformamide, dimethylsulfoxide, N-methylpyrrolidone, chloroform, toluene, ethanol, 2-methoxyethanol, 1,2-dichloroethane, ethyl acetate, diethyl ether, acid solutions (HCl, $H_2SO_4$, $HNO_3$) or basic solutions (NaOH, KOH) comprising EDTA (ethylenediaminetetraacetate), or their mixture. The washing can be carried out for a period of time ranging from 1 to 48 hours, preferably for a period of time of 24 hours, and can be repeated two to four times, preferably three times.

Preferably, stage (ii) is carried out with stirring.

A process for the detection of a target also forms part of the invention, said process comprising at least the following stages:

(i') bringing a sample comprising a target into contact with an imprinted polymer as defined according to the invention, and (ii') detecting the target, preferably by electrical measurement (conductivity, impedance) or by an electrochemical method (chronopotentiometry, chronoamperometry, voltammetry).

The cavity present in the structure of the imprinted polymer acts as housing for the target, more commonly referred to as recognition site (for the target), the redox probe being located so that it can interact with the target and provide an electrochemical response in the form of a detection signal. The redox probe is typically located in the vicinity of or within said cavity making it possible for the detection of the target.

The imprinted polymer of the invention has applications in the detection, solid-phase extraction, separation, purification and controlled release of molecules and ions in the (bio)medical, food processing and environmental fields.

The imprinted polymer of the invention can in particular be used:
- as sensor, and preferably as imprinted sensor, and more specifically as recognition phase in a sensor in the field of the detection of molecules and/or ions,
- as active interface for the manufacture of (bio)sensors,
- as solid-phase extraction support for the manufacture of a column for the solid-phase extraction of molecules and ions,
- for chromatography,
- for pseudo-immunoassays,
- for the manufacture of artificial antibodies,
- for the separation of enantiomers,
- for organic synthesis,
- for catalysis.

According to a particularly preferred embodiment, the imprinted polymer of the invention is used as sensor and more particularly as recognition phase in a sensor. The term used is then imprinted sensor.

Another subject matter is a device including at least one imprinted polymer as defined according to the invention, said device being an electrochemical (bio)sensor or an extraction column.

BRIEF DESCRIPTION OF THE DRAWINGS

In addition to the preceding provisions, the invention also comprises other provisions which will emerge from the description which will follow, which refers to nonlimiting examples of the process for the manufacture of an imprinted polymer according to the invention and to the evaluation of such a polymer, and also to the appended drawings, in which.

DETAILED DESCRIPTION OF THE PREFERRED EMBODIMENT(S)

Experimental Part

Figure 1:
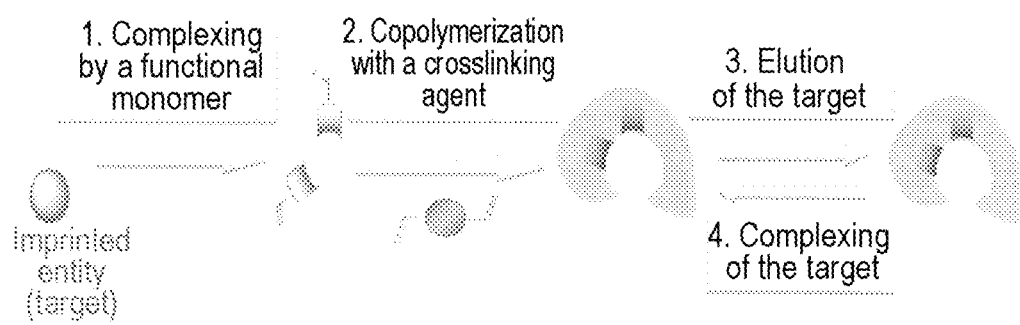
FIG. 1 gives a diagrammatic representation of the principle for the preparation of an MIP.
Figure 2:
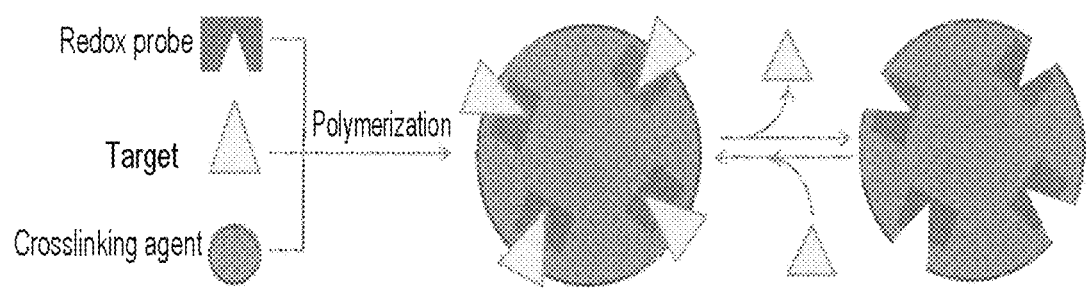
FIG. 2 shows the introduction of a redox probe within an MIP.

The invention is described below in connection with an application example relating to the detection of a target chosen from the family of the polycyclic aromatic hydrocarbons (PAHs), benzo[a]pyrene (BaP), in a liquid medium. The invention is nevertheless of more general application, whatever the nature of the target (molecule or ion) and/or the nature of the medium, provided that the redox probe can react with the target, providing a detection signal.

Preparation of Imprinted Polymers:

Molecularly imprinted polymers (MIP) according to the invention are prepared from vinylferrocene (VFc) (redox monomer) and ethylene glycoldimethacrylate (EDMA) (crosslinking agent), in the presence of a target chosen from the family of the polycyclic aromatic hydrocarbons (HAPs), benzo[a]pyrene (BaP) (scheme 1).

Scheme 1: Synthesis of an imprinted polymer according to the invention

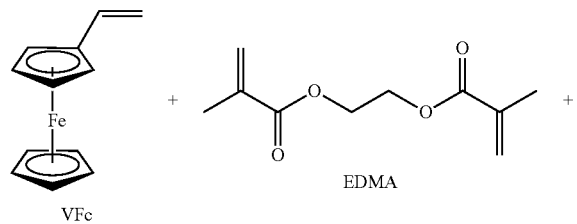

VFc + EDMA +

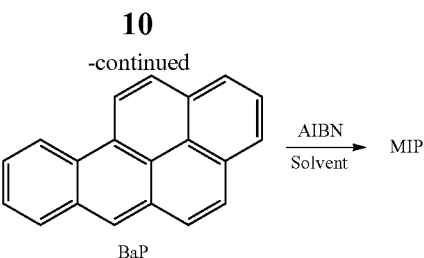

BaP

Process for the Synthesis of the Imprinted Polymers:

The imprinted polymers of the invention are prepared by distillation-precipitation polymerization (F. Bai et al., Macromolecules, 2004, Vol. 37, 9746-9752).

The arrangement consists of a 100 ml round-bottomed flask, a Dean and Stark apparatus (filled with the same solvent as that used for the polymerization or with a mixture of solvents) and a reflux condenser. The vinylferrocene (VFc), the ethylene glycoldimethacrylate (EDMA) and the target benzo[a]pyrene (BaP) are introduced into the round-bottomed flask provided with a magnetic stirrer.

The solvent is subsequently added (different mixtures of solvents were tested, see table 1) and then the round-bottomed flask is subjected to ultrasound in order to dissolve the solid.

100 µl of the solution are withdrawn for UV-visible spectroscopy analysis (determination of the exact amounts introduced). The solution is degassed for 10 minutes.

An initiator, azobisisobutyronitrile (AIBN), is added to the solution and then the medium is degassed for 5 minutes.

While keeping the stirring constant at a rate of 100 rpm, the solution is heated at a temperature of 80° C. for 30 minutes, and then the temperature is increased to approximately 115° C. Distillation is carried out at this temperature for 30 minutes, the Dean and Stark apparatus is emptied and the equivalent of half of the volume of the synthesis solvent is distilled off.

TABLE 1

Operating conditions tested for the preparation of imprinted polymers according to the invention

| | Solvent (% v/v) | | BaP/VFc/EDMA (w/w) | Stirring rate (rpm) | T (° C.) | Duration | Yield (before and after washing with dichloromethane) (%) | | Degree of conversion of the VFc | Appearance |
|---|---|---|---|---|---|---|---|---|---|---|
| | Acetonitrile | Toluene | | | | | before | after | | |
| MIP1 | 100 | 0 | 1/4.7/24 | 100 | 80-115 | 1 h 15 | 62 | 26 | 63 | Spheres of polydisperse size with short rods |
| MIP2 | 95 | 5 | 1/4.4/25.3 | 100 | 80-115 | 1 h 20 | 42 | 18 | 51 | Mixture of spheres of polydisperse size with sponge particles |
| MIP3 | 90 | 10 | 1/5/21 | 100 | 80-115 | 1 h 20 | 57 | 25 | 47 | Mixture of spheres of polydisperse size with short rods |
| MIP4 | 85 | 15 | 1/5.5/30 | 100 | 80-115 | 1 h 15 | 46 | 19 | 21 | Mixture of spheres of polydisperse size with short rods |
| MIP5 | 80 | 20 | 1/4.1/21.4 | 100 | 80-115 | 1 h 15 | 74 | 31 | 46 | Spheres of quasi-monodisperse size |

TABLE 1-continued

Operating conditions tested for the preparation of imprinted polymers according to the invention

| | Solvent (% v/v) | | BaP/VFc/ EDMA (w/w) | Stirring rate (rpm) | T (° C.) | Duration | Yield (before and after washing with dichloromethane) (%) | | Degree of conversion of the VFc | Appearance |
|---|---|---|---|---|---|---|---|---|---|---|
| | Aceto-nitrile | Toluene | | | | | before | after | | |
| MIP6 | 70 | 30 | 1/4/20 | 100 | 80-115 | 1 h 50 | 70 | 33 | 23 | Spheres of quasi-monodisperse size |

The imprinted polymers of the invention are subsequently washed in order to remove the target which was used for the preparation of the imprint during the polymerization.

The release of the BaP target is carried out by bringing the polymer into contact with 10 ml of dichloromethane, with stirring, for a period of time of 24 hours. This operation is repeated three times (3 cycles of 24 hours), with an efficiency of 93%.

In parallel, nonimprinted polymers (NIPs) were prepared under the same conditions as the MIPs of the invention, except for the presence of the target. Consequently, these polymers do not have a cavity having the shape of a target.

Figure 3:
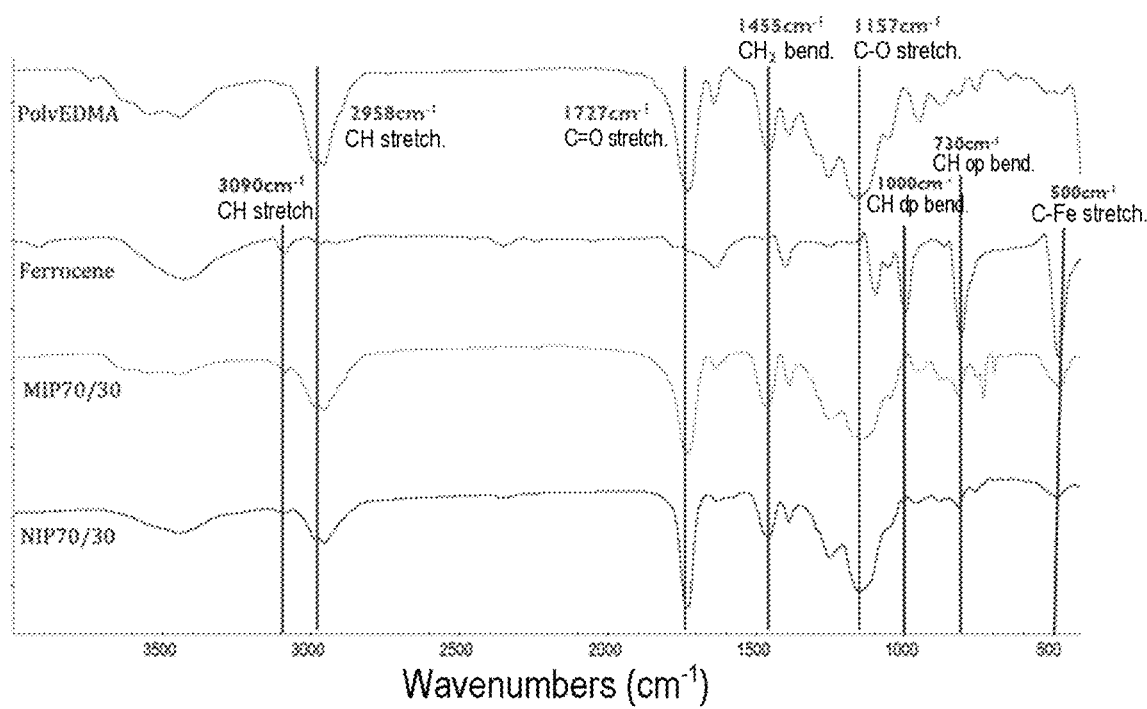
FIG. 3 represents the FTIR spectra of polyEDMA, ferrocene, MIP6 and NIP6.

Characterization of the Imprinted Polymers:

Infrared Analysis:

The molecularly imprinted polymer MIP6 and the nonimprinted polymer NIP6 are characterized by infrared (Nexus-ThermoNicolet apparatus). The samples are prepared in the form of KBr pellets. The comparison of the FTIR spectra of the MIP6 and of the NIP6 with those of a polyEDMA and of ferrocene makes it possible to demonstrate the correct incorporation of the VFc redox probe in the EDMA-based polymer matrix. The peaks characteristic of EDMA and of ferrocene are encountered both in the MIP6 and in the NIP6 (FIG. 3).

Figure 4:
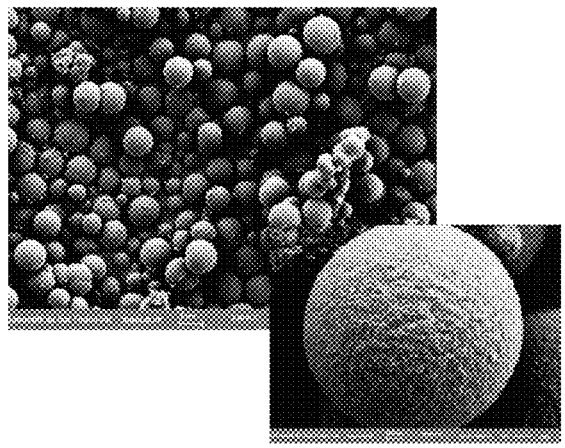
FIG. 4 represents SEM images of the particles of the MIP5 and NIP5 polymers.
Figure 4:
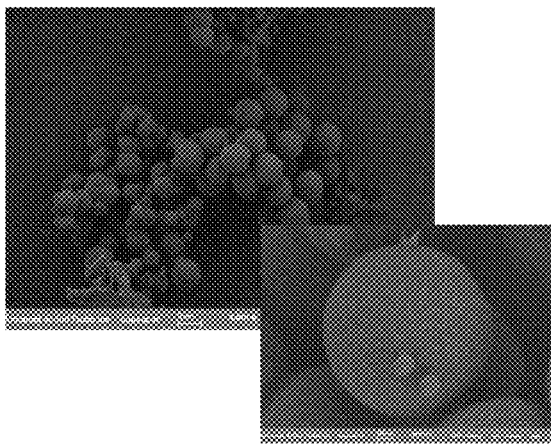
Figure 5:
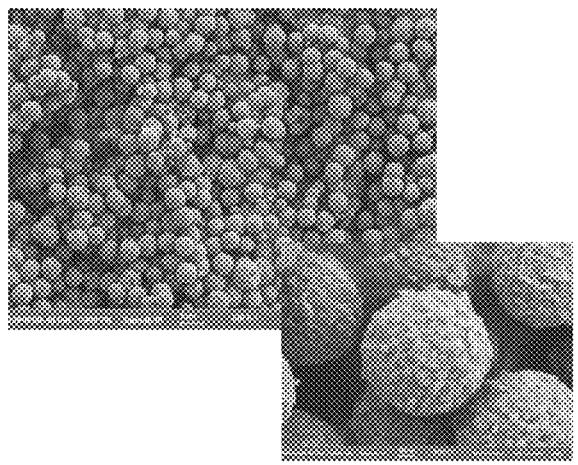
FIG. 5 represents SEM images of the particles of the MIP6 and NIP6 polymers.
Figure 5:
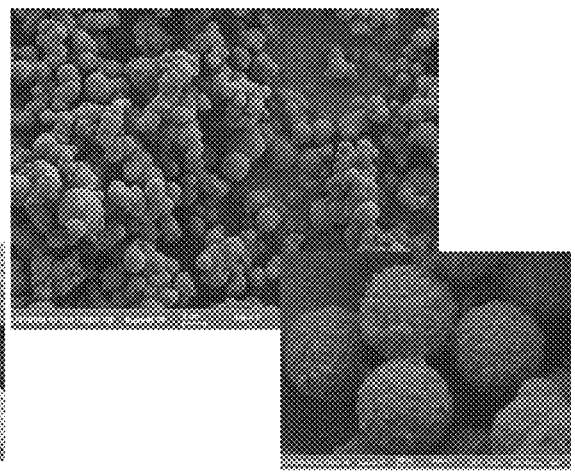

Analysis by Scanning Electromicroscopy (SEM):

The particles of MIP5/NIP5 and MIP6/NIP6 polymers are observed by scanning electromicroscopy (SEM) (Gemini® Supra 40VP apparatus). FIG. 4 represents, on the left, particles of MIP5 polymer (mean size: 2.45 µm; coefficient of variation: 25%) and, on the right, particles of NIP5 polymer (mean size: 1.7 µm; coefficient of variation: 39%). FIG. 5 represents, on the left, particles of MIP6 polymer (mean size: 1.5 µm; coefficient of variation: 26%) and, on the right, particles of NIP6 polymer (mean size: 1.8 µm; coefficient of variation: 45%). The coefficient of variation (CV) gives information on the distribution of the sizes of the particles:

$CV(\%)=$(standard deviation×100)/mean size (over 100 particles).

The particles of MIP polymers are more spherical and more homogeneous than those of the NIP polymers. The BaP target thus promotes the precipitation of the polymer chains by affecting the solubility parameters of the medium. The increase in the amount of nonpolar solvent (toluene) also modifies the morphology of the surface of the particles.

Evaluation of the Properties of the Imprinted Polymers:

1) Adsorption Properties of the MIPs: Adsorption Isotherms Principle:

The adsorption capacity with regard to the target molecule (BaP) of the imprinted polymer is evaluated by the adsorption isotherms. This method consists in bringing a known amount of polymer into contact with a solution comprising the target molecule and in determining the amount adsorbed by the polymer. The adsorption capacity (binding capacity, denoted Q) is the maximum amount of target molecule adsorbed by the polymer (expressed in mg of target/g of polymer resin, or in µmol/g). This value is to be compared with that obtained for the nonimprinted polymer in order to determine the effect of imprinting.

The imprint factor is the ratio of the maximum adsorption capacity of the imprinted polymer to that of the nonimprinted polymer.

Experimental Part:

10 mg of polymer are introduced into a 30 ml glass flask. 10 ml of BaP solution with a concentration varying between 0.1 and 20.0 mg·l$^{-1}$ are subsequently added. The contacting operation is carried out with an orbital stirrer at a rate of 200 rpm, for a period of time of 24 hours. The supernatant is filtered through a 0.45 µm PTFE filter and analyzed by UV-visible spectroscopy in order to determine the amount of BaP adsorbed by the polymer. The amount adsorbed/grams of polymer is plotted as a function of the equilibrium concentration (concentration of the supernatant).

Figure 6:
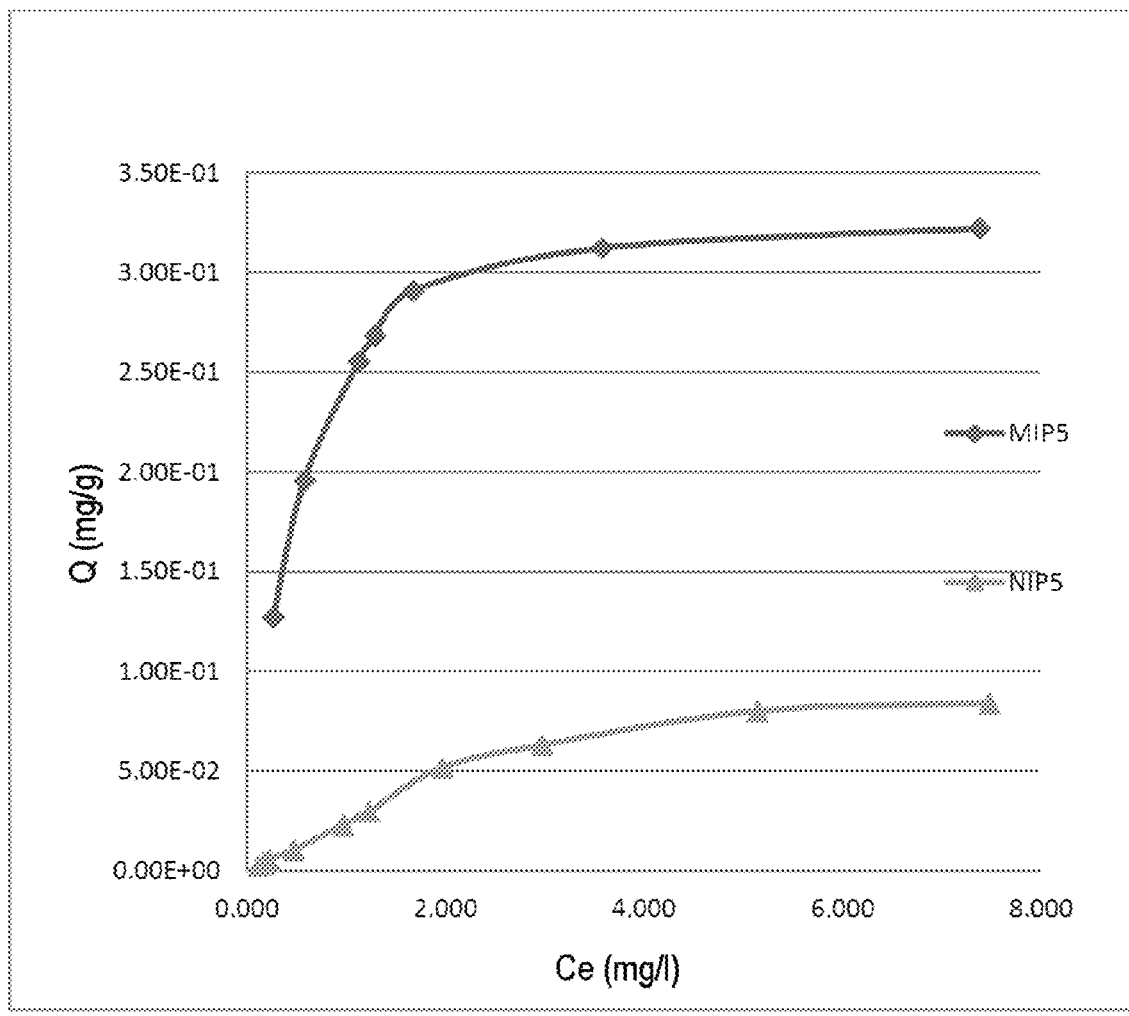
FIG. 6 represents the adsorption isotherm of the MIP5 polymer according to the invention and of a corresponding nonimprinted polymer NIP5 in toluene.

Results:

Absorption Isotherms in Toluene (FIG. 6):

The curves of adsorption isotherms in toluene of the MIP5 polymer synthesized and of the corresponding NIP5 polymer are represented in FIG. 6, in which $C_e$ represents the BaP concentration at equilibrium.

It is apparent that:

the adsorption capacity increases strongly for low concentrations of BaP, and then reaches its maximum when the equilibrium concentration reaches approximately 5 mg·l$^{-1}$ of BaP, the maximum adsorption capacity of the MIP5 polymer is 0.31±0.01 mg·g$^{-1}$ and that of the NIP5 polymer is 0.08±0.1 mg·g$^{-1}$: the imprinted polymers of the invention thus exhibit a greater adsorption capacity than the nonimprinted polymers, the MIP5/NIP5 imprint factor is 3.9: the MIP5 polymer adsorbs 3.9 times more BaP than the NIP5 polymer.

Adsorption Isotherms in a 99/1 (v/v) Water/Acetonitrile Mixture (FIG. 7):

The performances of the imprinted polymers of the invention were evaluated in a medium similar to the application medium, i.e. water. As BaP is not very soluble in water, the study is carried out in a 99/1 (v/v) water/acetonitrile solution.

Figure 7:
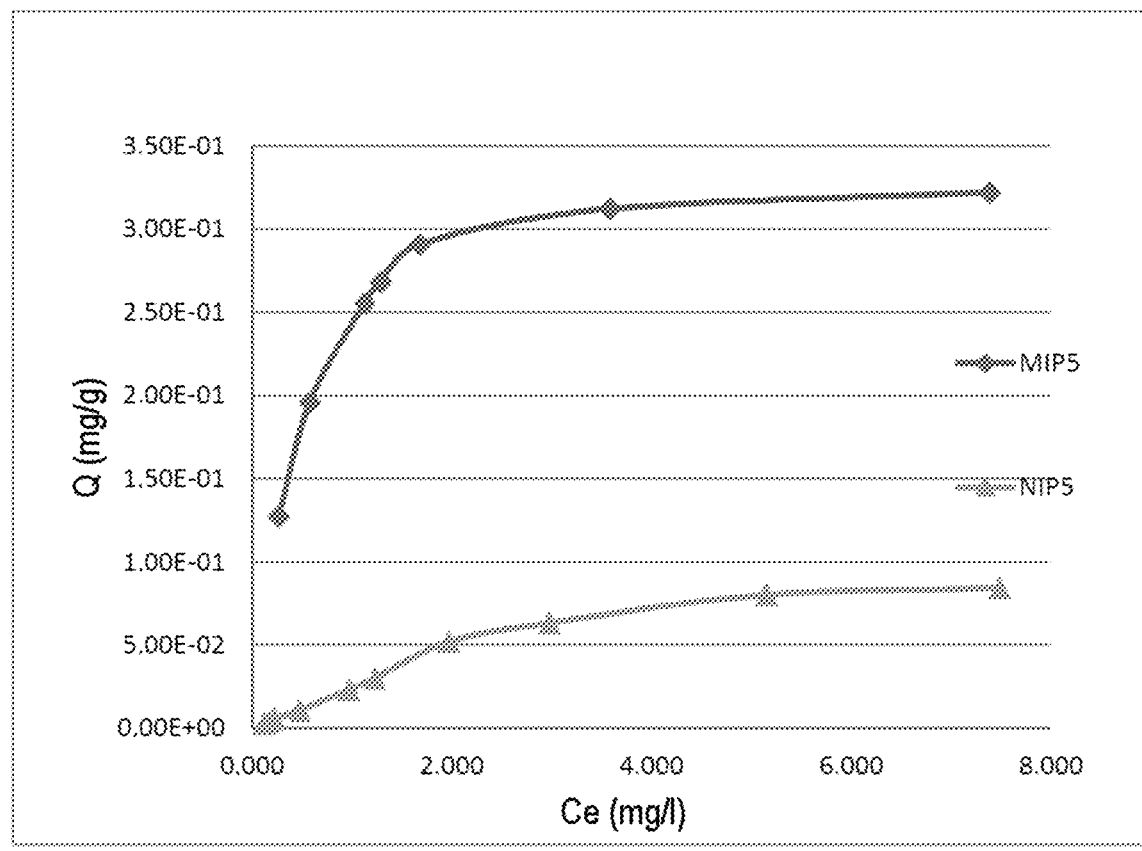
FIG. 7 represents the adsorption isotherm of the MIP5 polymer according to the invention and of the NIP5 polymer in a water/acetonitrile (99/1, v/v) mixture.

The results are presented in FIG. 7, in which $C_e$ represents the BaP concentration at equilibrium.

It is observed that, for the MIP5 polymer of the invention, the adsorption increases very rapidly for the low concentrations and reaches the plateau at a concentration of approximately 1 mg·l$^{-1}$. The maximum capacity is 6.5 mg·g$^{-1}$. In the case of the NIP5 polymer, the plateau is reached for 3 mg·l$^{-1}$ with a capacity of 3.2 mg·g$^{-1}$, hence an imprint factor of 2.05.

The maximum adsorption capacity in an aqueous medium is consequently 20 times greater than the adsorption capacity in the organic medium.

2) Comparison of the Performances of the Imprinted Polymers of the Invention with Respect to the Imprinted Polymers Described in the Prior Art The results obtained with the MIP5 polymer of the invention in comparison with the results presented in the literature are compared in table 2 below.

The adsorption capacity (Q) and imprint factor values as a function of the technique for quantifying the target, of the medium in which the experiment takes place, of the monomers used and of the polymerization route are compared in table 2.

TABLE 2

Comparison of the performances of the imprinted polymers of the invention with respect to the imprinted polymers described in the prior art

| Bibliographic reference | Q | MIP/NIP imprint factor | Technique for quantifying the target (BaP) | Medium | Polymer | Polymerization route |
|---|---|---|---|---|---|---|
| MIP5 | 0.31 mg/g | 3.9 | UV-visible spectroscopy | toluene | VFc-EDMA | precipitation |
|  | 6.5 mg/g | 2.0 |  | 99/1 v/v water/acetonitrile |  |  |
| (1) | 5.8-16.3 µg/g | 2.0 | fluorimeter | dichloromethane | 4VP-EDMA, 4VP-DVB, MAA-DVB, TFMAA-DVB | bulk |
| (2) | 1.93 mg/g | 2.4 | GCMS | dichloromethane | 4VP-EDMA | bulk |
| (3) | 6.93 mg/g | 4.5 | GCMS | 99/1 v/v water/ACN | MAA-EDMA | bulk |
| (4) | 0.7 mg/g | 6.0 | fluorimeter | acetonitrile | MAA-EDMA | electropolymerization |
| (5) | 6 mg/g | 3.0 | GCMS | acetonitrile | MAA-EDMA | bulk |

(1) J. P. Lai et al., Analytica Chimica Acta, 2004, Vol. 522, No. 2, 137-144,
(2) R. J. Krupadam et al., Analytical and Bioanalytical Chemistry, 2010, Vol. 397, No. 7, 3097-3106,
(3) R. J. Krupadam et al., Environmental Science & Technology, 2009, Vol. 43, No. 8, 2871-2877,
(4) R. J. Krupadam et al., Water Research, 2010, Vol. 44, No. 3, 681-688,
(5) R. J. Krupadam et al., Journal of Nanoscience and Nanotechnology, 2009, Vol. 9, 5441-5447.

The imprinting effect of the MIP5 polymer of the invention is of the same order of magnitude as those reported in the literature. The presence of the redox monomer thus does not disrupt the specific recognition of the MIP particles.

3) Electrochemical Properties

Electrochemical Studies by Differential Pulse Voltammetry (DPV):

Principle:

In differential pulse voltammetry (DPV), a linear potential gradient of low amplitude is applied, for a short time typically of 50 ms, every 150 to 200 ms. The current is measured immediately before the application of each pulse and immediately at the end of each pulse for a short period (10-20 ms). The signal recorded is the difference in current between these two measurements as a function of the potential E, resulting in a differential curve having the appearance of a peak. This technique makes it possible to increase the faradic current/capacitive current ratio and thus the sensitivity.

Acquisition Parameters:
Initial potential: −0.100 V
Vertex potential: 0.000 V
Final potential: 1.000 V
Pulse amplitude: 0.05 V
Duration of the pulse: 50 ms
Height: 1 mV
Period: 100 ms
Scan rate: 0.01 mV/s
Number of points: approximately 2100

Preparation of the Working Electrode:

Carbon paste is mixed with the MIP5 polymer or the NIP5 polymer with a ratio of 4:1 by weight. The mixture is homogenized with a small amount of solvent (dichloromethane). When the mixture is fairly fluid, it is placed in a hollow working electrode (Metrohm electrode), and then dried under vacuum. The surplus is removed by polishing the surface of the electrode.

Electrodes used for the Measurements:
Working electrode: solid electrode with a surface area of 0.070 cm$^2$ (carbon paste+polymer ratio 4/1 w/w electrode),
Reference electrode: saturated calomel electrode (KCl: 0.242 V),
Counterelectrode: platinum electrode, diameter 1 cm.

Experiments Carried Out:

An electrode comprising the carbon paste/MIP5 polymer (or NIP5 polymer) mixture is placed in an electrochemical cell containing 5 ml of an electrolyte solution (0.1 mol·l$^{-1}$ of tetrabutylammonium hexafluorophosphate in acetonitrile). The redox signal of the ferrocene is observed for both types of working electrode (MIP5 polymer and NIP5 polymer) at approximately 0.43 V (FIGS. 5 and 6). A normal period of time of 4 h 30 is necessary in order to obtain stabilization of this signal (time for equilibrium between the working electrode and the solution). After 4 h 30, the BaP target is added directly to the solution and then measurements are carried out at regular intervals.

Figure 8:
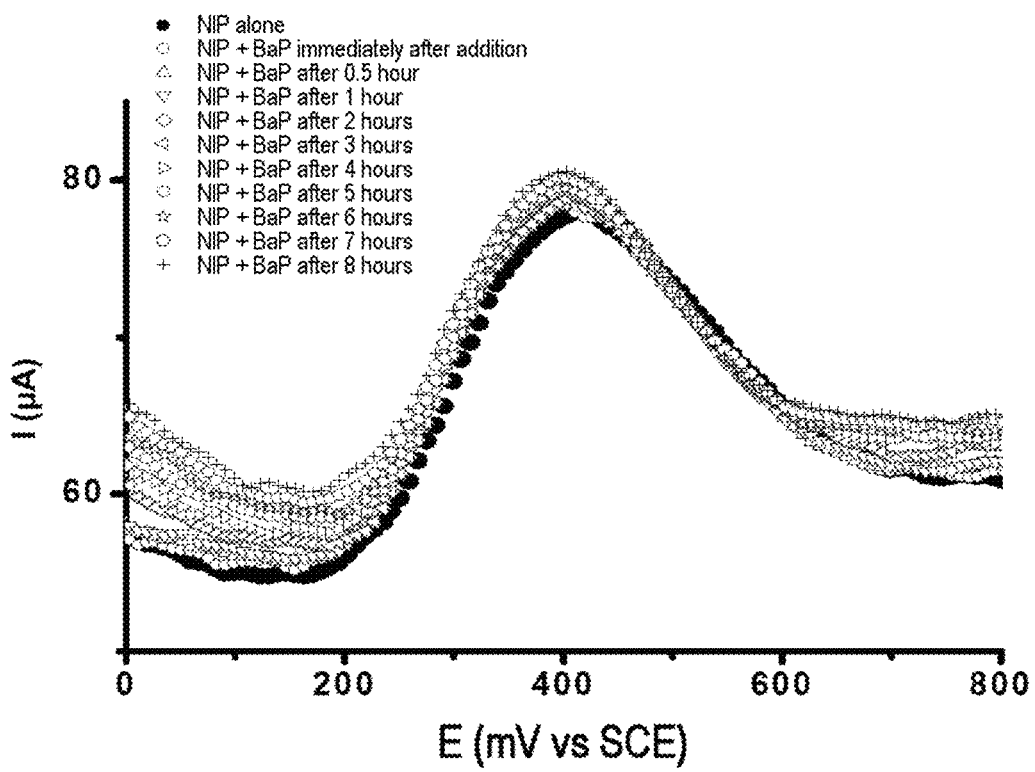
FIG. 8 represents the signal observed in differential pulse voltammetry (DPV) with the NIP5 polymer before and after addition of a BaP target.
Figure 8:
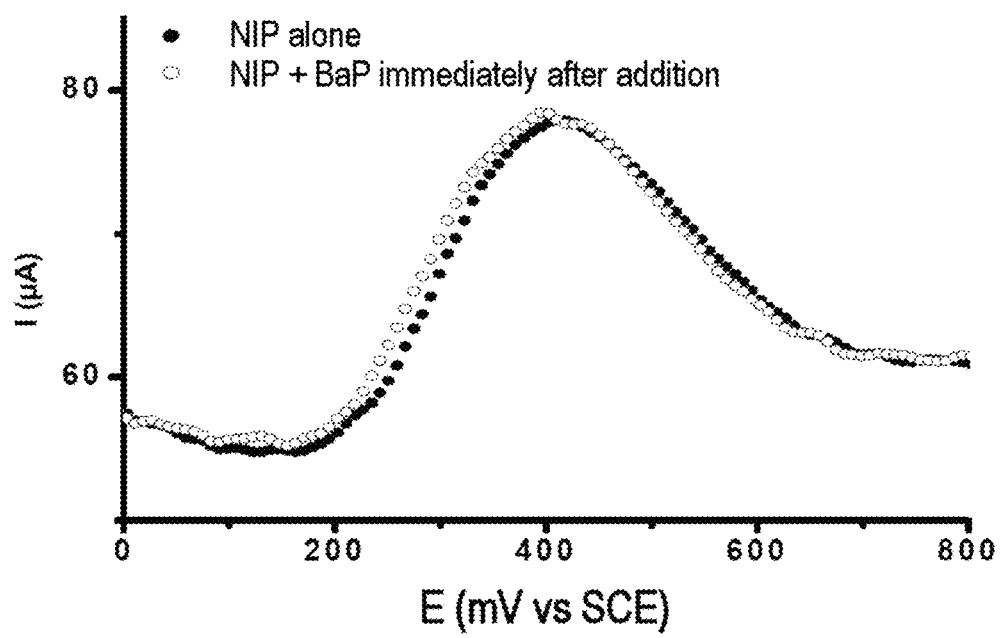

Carbon Paste/NIP5 Polymer Electrode (FIG. 8):

"NIP alone" represents the voltammogram of the NIP5 polymer in the carbon paste after stabilization for 4 h 30.

"NIP+BaP immediately after addition" represents the voltammogram recorded immediately after addition of the BaP target.

"NIP+BaP after 0.5 hour" represents the voltammogram recorded 30 minutes after the addition of the BaP target.

A first curve is recorded approximately 30 seconds after the addition of the BaP target (NIP+BaP immediately after addition curve) and then subsequently at regular intervals up to 8 hours (NIP+BaP after 0.5 hour curve recorded after 30 minutes). A modification to the appearance of the voltammogram of the ferrocene in the NIP polymer when it and the BaP target are brought together is not observed.

Figure 9:
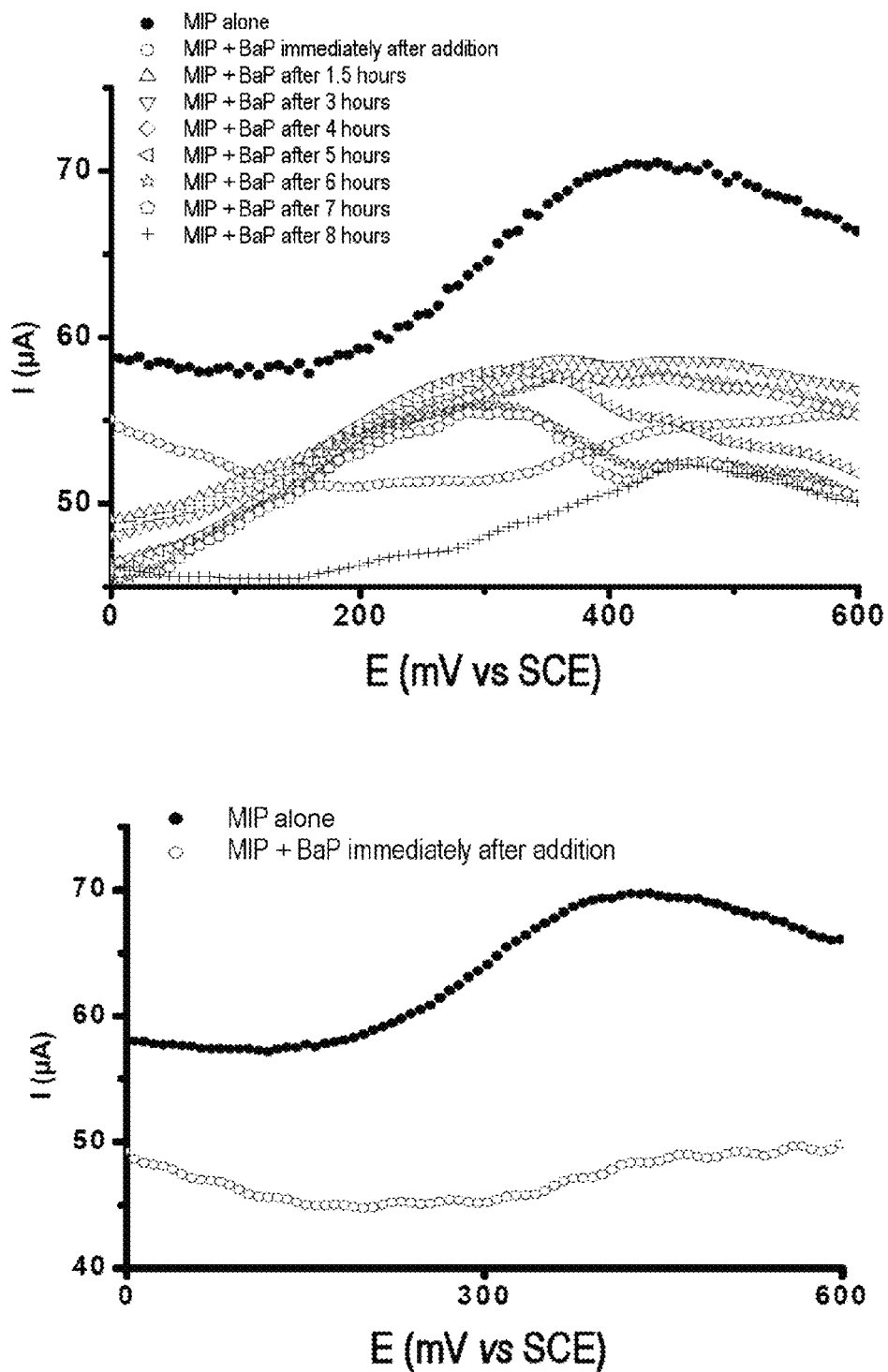
FIG. 9 represents the signal observed in differential pulse voltammetry (DPV) with the MIP5 polymer before and after addition of the BaP target.

Carbon Paste/MIP5 Polymer Electrode (FIG. 9):

The same experiment is carried out by introducing the MIP5 polymer mixed with carbon paste into the electrode. The redox signal of the ferrocene is observed at approximately 0.43 V.

The "MIP5 alone" curve represents the voltammogram of the MIP5 polymer in the carbon paste after stabilization for 4 h 30.

The "MIP+BaP immediately after addition" curve represents the voltammogram recorded immediately after the addition of the BaP target.

The "MIP+BaP after 1.5 hours" to "MIP+BaP after 8 hours" curves represent the voltammograms recorded at regular intervals.

An immediate variation in the electrochemical response in the presence of BaP is observed, this occurring from 30 seconds. The variation in the voltammograms observed between the MIP5 and NIP5 polymers after addition of the BaP target is related to the imprinting effect, insofar as the experiments were carried out according to the same protocol, without there being any intervention with regard to the electrodes, the connections or the potentiostat, before or after addition of the BaP target.

4) Comparative Study of the Properties of the MIP5/NIP5 and MIP6/NIP6 Polymers by HPLC-UV Two properties are compared: the adsorption of the target molecule and the selectivity in the presence of interfering molecules.

Adsorption Properties:

The adsorption is carried out by contact between a known amount of polymer and a solution of known concentration of the targets (BaP alone in the case of the adsorption study and BaP with another PAH in the case of the selectivity study). The mixture is stirred by an orbital stirrer at a rate of 250 rpm. After a contact time of five hours, the supernatant is analyzed by HPLC-UV in order to determine the amount of each entity remaining and the amount adsorbed. The eight PAHs used in this study are represented in Scheme 2.

Scheme 2: PAHs used for the selectivity study

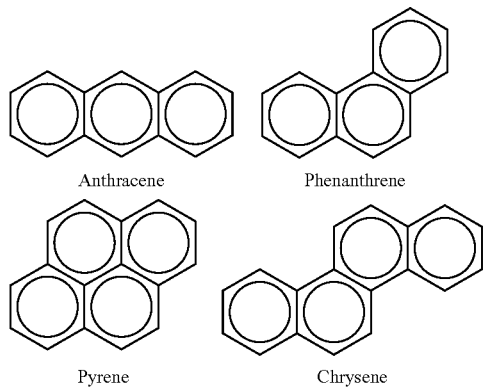

Anthracene    Phenanthrene

Pyrene    Chrysene

-continued

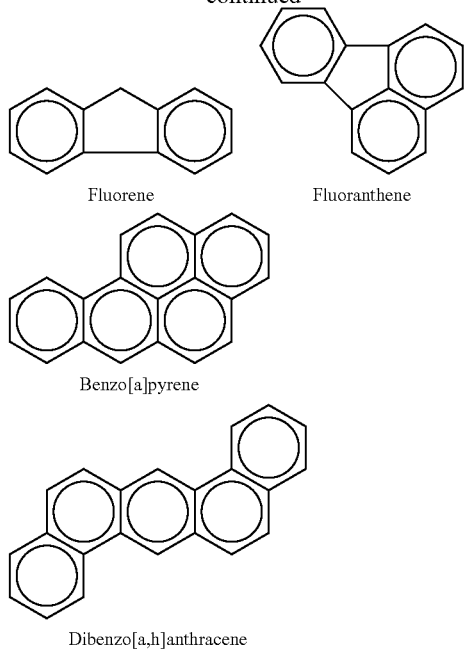

Fluorene    Fluoranthene

Benzo[a]pyrene

Dibenzo[a,h]anthracene

Isocratic elution (100% acetonitrile, analysis time 15 minutes) is used when only BaP is present. The elution gradient used for the selectivity study is presented in table 3 with an analysis time of one hour.

TABLE 3

Elution gradients used for the analysis of the PAH mixtures

| Time (min) | $H_2O$ (%) | ACN (%) |
|---|---|---|
| 0-10 | 45 | 55 |
| 10-35 | 0 | 100 |
| 35-55 | 0 | 100 |

HPLC-UV Analysis Conditions:

Column: Lichrospher® PAH (5 μm) (Merck KGaA)

Detector: Hitachi L-2455 DAD

Temperature of the oven: 30° C.

Injection volume: 50 μl

Flow rate: 0.5 ml/min

The eight PAHs are introduced in a 99/1 (v/v) water/acetonitrile mixture.

Figure 10:
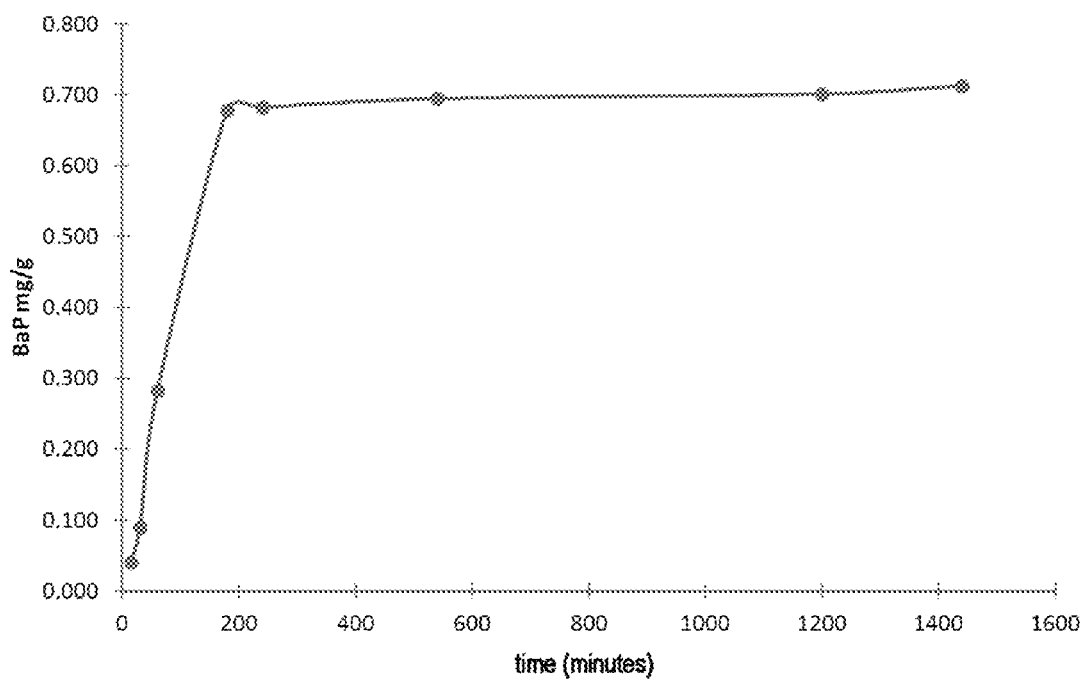
FIG. 10 shows the kinetics of adsorption of the BaP on the MIP6 polymer as a function of the time.

Adsorption Kinetics:

The MIP6 polymer is brought into contact with a BaP solution having a concentration equal to 1.25 mg·l$^{-1}$ (i.e., 5 μmol·l$^{-1}$). The supernatant is analyzed during the contact time. The adsorption is maximum and constant after a contact time of approximately 4 hours (reference time) (FIG. 10).

Figure 11:
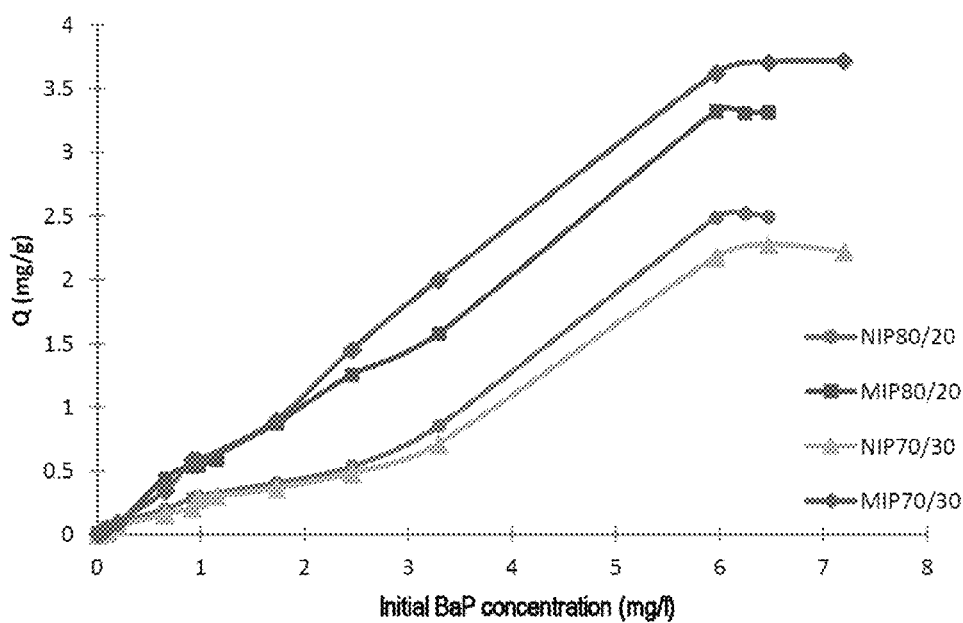
FIG. 11 represents the adsorption capacity (Q) of various polymers as a function of the initial concentration of BaP solutions.
Figure 12:
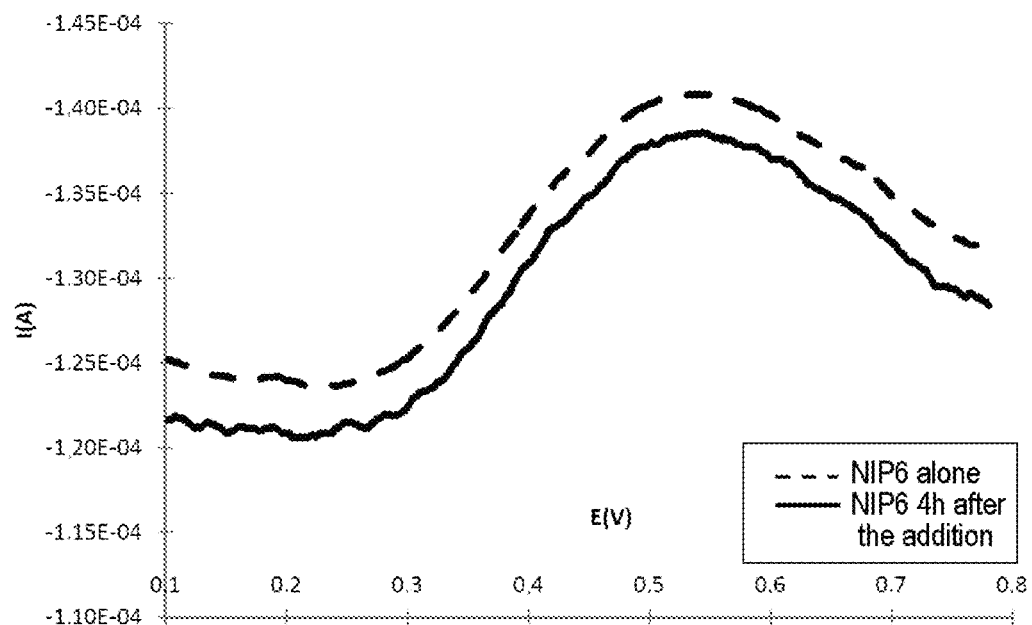
FIG. 12 represents the SWV voltammograms of the NIP6 in the absence (top curve) and in the presence of BaP after 4 hours of contact (bottom curve)
Figure 13:
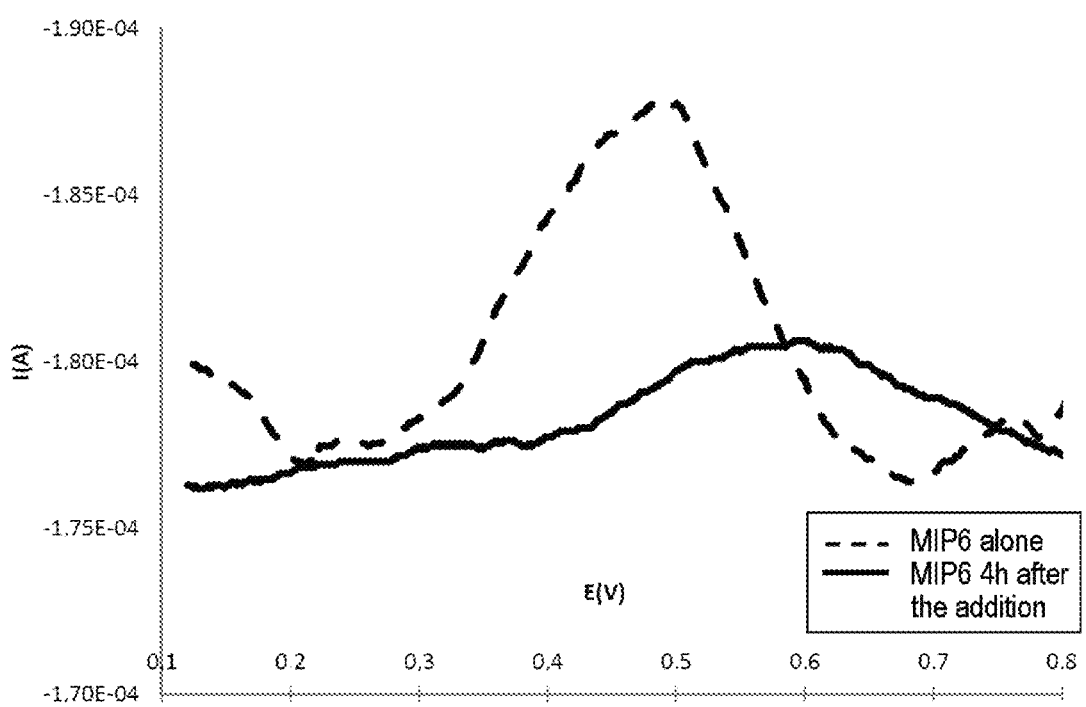
FIG. 13 represents the SWV voltammograms of the MIP6 in the absence (top curve) and in the presence of BaP after 4 hours of contact (bottom curve).

Adsorption Isotherm:

The increase in the adsorption as a function of the BaP concentration is observed, followed by a plateau which corresponds to the adsorption capacity (Q) (FIG. 11). The imprint factor (ratio of the adsorption capacity of the imprinted polymer to that of the nonimprinted polymer) is also determined. The results obtained for the MIP5, MIP6, NIP5 and NIP6 polymers are summarized in table 4.

TABLE 4

Adsorption capacities and imprint factors

|  | Q (mg · g⁻¹) |  | Q (mg · g⁻¹) | Imprint factor |
|---|---|---|---|---|
| MIP5 | 3.30 | NIP5 | 2.50 | 1.32 |
| MIP6 | 3.70 | NIP6 | 2.28 | 1.62 |

The values for adsorption capacity (Q) which are known from the prior art are between 5.8 µg·g⁻¹ and 7 µg·g⁻¹ (R. J. Krupadam et al., Sensors and Actuators B: Chemical, 2007, Vol. 26, pp 444-451; F. L. Dickert et al., Anal. Chem., 1999, Vol. 71, pp 4559-4563; L. H. Wei et al., Journal of Environmental Science and Health, Part. A, 2010, Vol. 45, pp 211-223; J. P. Lai et al., Analytica Chimica Acta, 2004, Vol. 522, No. 2, 137-144; R. J. Krupadam et al., Water Research, 2010, Vol. 44, No. 3, 681-688). The comparison of the adsorption capacities shows that the MIPs of the invention exhibit good properties of recognition of BaP.

Models of the Adsorption Isotherms:

The isotherms produced above can be modeled in order to interpret the adsorption phenomena (E. Corton et al., Journal of NonCrystalline Solids, 2007, Vol. 353, No. 8-10, pp 974-980; G. Limousin et al., Applied Geochemistry, 2007, Vol. 22, No. 2, pp 249-275). For homogeneous adsorption, the adsorption parameters can be estimated directly. In the case of nonhomogeneous adsorption, the appraisal is based on generalizing the contributions of the adsorption of high affinity at low concentrations and those of the adsorption of low affinity at high concentrations. In a first step, two models are studied: simple Langmuir and Freundlich.

✓ Simple Langmuir Model

This model is based on the following five assumptions:

the adsorption capacity can have a maximum value ($Q_{max}$), all the sites are equivalent, each site is occupied by just one molecule, the energy and the stearic hindrance are not dependent on the amount adsorbed, and the surface activity coefficient is equal to 1 (homogeneous adsorption).

Taking in account that Q=amount adsorbed (or adsorption capacity) and C=free amount (or equilibrium concentration), after a linearization:

$$\frac{1}{Q} = \frac{1}{QeK_0C} + \frac{1}{Qe}$$

with:

$K_0$=adsorption affinity coefficient, and

Qe=equilibrium adsorption capacity.

✓ Freundlich Model

This model is based on an empirical function for a nonideal multilayer adsorption on a heterogeneous surface:

$$Q = aC^m$$

$$\log Q = \log a + m \log C$$

with:

a=Freundlich adsorption coefficient, and m=heterogeneity index (0≤m≤1).

After application of the two models to the experimental values obtained, the correlation coefficients and the equilibrium constants are determined and summarized in table 5.

TABLE 5

Summary of the correlation constants ($R^2$) and Langmuir isotherm equilibrium constants ($K_L$) and Freundlich isotherm equilibrium constants ($K_F$) of the different polymers

| | $R^2$ Langmuir | $K_L$ (l · mg⁻¹ BaP) | Qe (mg · g⁻¹) | Q (mg · g⁻¹) experimental | $R^2$ Freundlich | $K_F$ (l · mg⁻¹ BaP) |
|---|---|---|---|---|---|---|
| MIP5 | 0.9433 | 0.3957 | 4.523 | 3.30 | 0.9625 | 1.266 |
| NIP5 | 0.9951 | 0.5568 | 1.477 | 2.50 | 0.9178 | 0.457 |
| MIP6 | 0.9974 | 1.0571 | 2.359 | 3.70 | 0.9686 | 1.501 |
| NIP6 | 0.9896 | 0.6518 | 0.914 | 2.28 | 0.9367 | 0.387 |

With the exception of the MIP5, the polymers exhibit an adsorption behavior closer to the Langmuir model. However, the Qe values are distant from the experimental values, hence the need to apply other models (for example, Langmuir-Freundlich) in order to better approach experimental values (to obtain a better correlation coefficient).

Selectivity:

The selectivity measurement is carried out by bringing the polymer into contact with a solution comprising BaP and another PAH at a concentration of each of the entities of approximately 0.45 µmol·l⁻¹, and the adsorption capacities are determined.

Various coefficients are determined from the adsorption results for each entity. The results are summarized in tables 6 and 7.

The distribution coefficient ($K_d$) is the ratio of the adsorption capacity at an equilibrium concentration to this equilibrium concentration ($C_e$):

$$K_d = \frac{Q_e}{C_e}$$

The selectivity coefficient (k) is the ratio of the distribution coefficient of the target to that of the interfering molecule:

$$k = \frac{K_d BaP}{K_d PAH}$$

The relative selectivity coefficient k' is the ratio of k of the MIP to k of the NIP:

$$k' = \frac{k_{MIP}}{k_{NIP}}$$

TABLE 6

Adsorption capacities and imprint factors for each PAH entity

| | Adsorption capacity Q (µmol · g$^{-1}$) | | | Adsorption capacity Q (µmol · g$^{-1}$) | | |
|---|---|---|---|---|---|---|
| | MIP80/20 | NIP80/20 | IF | MIP70/30 | NIP70/30 | IF |
| Fluorene | 0.23 | 0.18 | 1.28 | 0.24 | 0.13 | 1.85 |
| Phenanthrene | 0.12 | 0.12 | 1.00 | 0.19 | 0.11 | 1.73 |
| Anthracene | 0.30 | 0.23 | 1.30 | 0.19 | 0.12 | 1.58 |
| Fluoranthene | 0.21 | 0.2 | 1.05 | 0.23 | 0.13 | 1.77 |
| Pyrene | 0.25 | 0.24 | 1.04 | 0.3 | 0.12 | 2.50 |
| Chrysene | 0.23 | 0.18 | 1.28 | 0.28 | 0.16 | 1.75 |
| Benzo[a]pyrene (BaP) * | 0.20 | 0.14 | 1.39 | 0.19 | 0.09 | 2.11 |
| Dibenzo[a,h]anthracene | 0.01 | 0.01 | 1.00 | 0.01 | 0.01 | 1.00 |

* Mean value

TABLE 7

Selectivity coefficients (k) and relative selectivity coefficients (k') with literature data

| | k MIP5 | k NIP5 | k' — | k MIP6 | k NIP6 | k' | k'* 4VP-co-EDMA |
|---|---|---|---|---|---|---|---|
| Fluorene | 0.560 | 0.580 | 0.97 | 0.658 | 0.639 | 1.03 | NA |
| Phenanthrene | 2.862 | 1.590 | 1.80 | 2.310 | 1.422 | 1.62 | NA |
| Anthracene | 0.449 | 0.375 | 1.20 | 1.605 | 0.401 | 4.01 | 1.19 |
| Fluoranthene | 0.722 | 0.553 | 1.31 | 0.802 | 0.433 | 1.85 | NA |
| Pyrene | 0.552 | 0.483 | 1.14 | 0.402 | 0.659 | 0.61 | 1.39 |
| Chrysene | 0.624 | 0.580 | 1.08 | 0.567 | 0.574 | 0.99 | 1.27 |

*Literature data: J. P. Lai et al. Analytica Chimica Acta, 2004, Vol. 522, No. 2, 137-144

Generally, the imprint factors are greater than 1. This shows that the MIPs have a better adsorption capacity for the PAHs. The relative selectivity coefficients (k') are close to 1.

Electrochemical Properties:

In order to evaluate the electrochemical properties of the imprinted polymers, the particles of MIP6 and NIP6 polymer are mixed with a conductive matrix (carbon paste) and then the combination is placed in a hollow working electrode with a diameter of 5 mm. The technique used is square wave voltammetry (SWV).

The electrode is first of all dried under vacuum and then the analysis is carried out in an organic medium (0.1M tetrabutylammonium hexafluorophosphate or TBAPF$_6$/acetonitrile). A voltammogram is recorded regularly over a period of 2 hours, until the signal has stabilized, and then a BaP solution is added so as to saturate the polymer. Recording is carried out over a period of 22 hours. The solution is continuously stirred using a magnetic bar. Stirring is halted 1 minute 30 seconds before each measurement. The results obtained for the MIP6 and NIP6 polymers are presented in FIGS. 9 and 10.

Instrumentation:
Potentiostat: Potentiostat/Galvanostat Model 273A (EG&G Princeton Applied Research)
Experimental Parameters:
Equilibration at 0.000 V for 30 s
Initial potential: 0.000 V
Vertex potential: 1.000 V
Pulse amplitude: 0.15 V
Duration of the pulse: 50 ms
Height: 2 mV
Period: 100 ms
Scan rate: 20 mV/s In the case of the NIP6, a slight fall in the intensity is observed 22 hours after the addition of BaP but the effect is less than for the MIP. For the latter, a shift in oxidation potential and a fall in intensity 4 hours after the addition of BaP are observed.

The invention claimed is:

1. A nonelectrically conducting imprinted polymer obtained by polymerization of at least one redox monomer with at least one crosslinking agent in the presence of a target, said polymer exhibiting, at least one cavity having the shape of said target;
   wherein the at least one redox monomer is chosen from metallocenes, tetrathiafulvalene and compounds having tetrathiafulvalene present, or anthraquinone and compounds having anthraquinone present;
   the imprinted polymer transmits an electric or electrochemical signal; the redox monomer being the sole means for transmitting the signal in the imprinted polymer;
   wherein the target is a molecule selected from polycyclic aromatic hydrocarbons (PAHs), steroids, surfactants or food dyes.

2. The imprinted polymer as claimed in claim 1, wherein the at least one redox monomer exhibits at least one polymerizable site.

3. The imprinted polymer as claimed in claim 2, wherein the at least one redox monomer carries at least one functional ferrocene group having a polymerizable site.

4. The imprinted polymer as claimed in claim 3, in which the at least one redox monomer is vinylferrocene.

5. A process for the preparation of an imprinted polymer as claimed in claim 1, comprising the following stages:

i. the polymerization of the at least one redox monomer with the at least one crosslinking agent in the presence of the target, and ii. the removal of the target present within the polymer obtained at the end of stage (i).

6. The process as claimed in claim 5, wherein the at least one redox monomer exhibits at least one polymerizable site.

7. The process as claimed in claim 5, in which the polymerization stage (i) is carried out by distillation-precipitation.

8. A process for the detection of a target comprising at least the following stages:

(i') bringing a sample comprising a target into contact with an imprinted polymer as defined according to claim 1, and (ii') detecting the target.

9. The process as claimed in claim 8, in which the detection stage (ii') is carried out by electrical measurement or by an electrochemical method, such as chronopotentiometry, chronoamperometry or voltammetry.

10. A sensor for detection of molecules and/or ions, said sensor comprising a recognition phase comprising the imprinted polymer according to claim 1.

11. A sensor or solid-phase extraction support, said sensor or solid-phase extraction support comprising an interface comprising the imprinted polymer according to claim 1.

12. A device including at least one imprinted polymer as defined according to claim 1.

13. The device as claimed in claim 12, in which said device is an electrochemical sensor or an extraction column.

14. The imprinted polymer as claimed in claim 3, wherein the polymerizable site is chosen from vinyl, (meth)acrylic or allyl sites.

15. The imprinted polymer as claimed in claim 3, wherein the target is a molecule chosen from polycyclic aromatic hydrocarbons (PAHs).

16. The imprinted polymer as claimed in claim 3, wherein the target is a molecule chosen from surfactants or food dyes.

17. The imprinted polymer as claimed in claim 1, the imprinted polymer comprising a mixture of a polar solvent and a non-polar solvent.

18. The imprinted polymer as claimed in claim 17, wherein a ratio of the polar solvent to the non-polar solvent is between 70/30 and 95/5.

* * * * *